June 12, 1951 L. TINGLE 2,556,238
THERMOCOUPLE CONSTRUCTION
Filed March 7, 1947
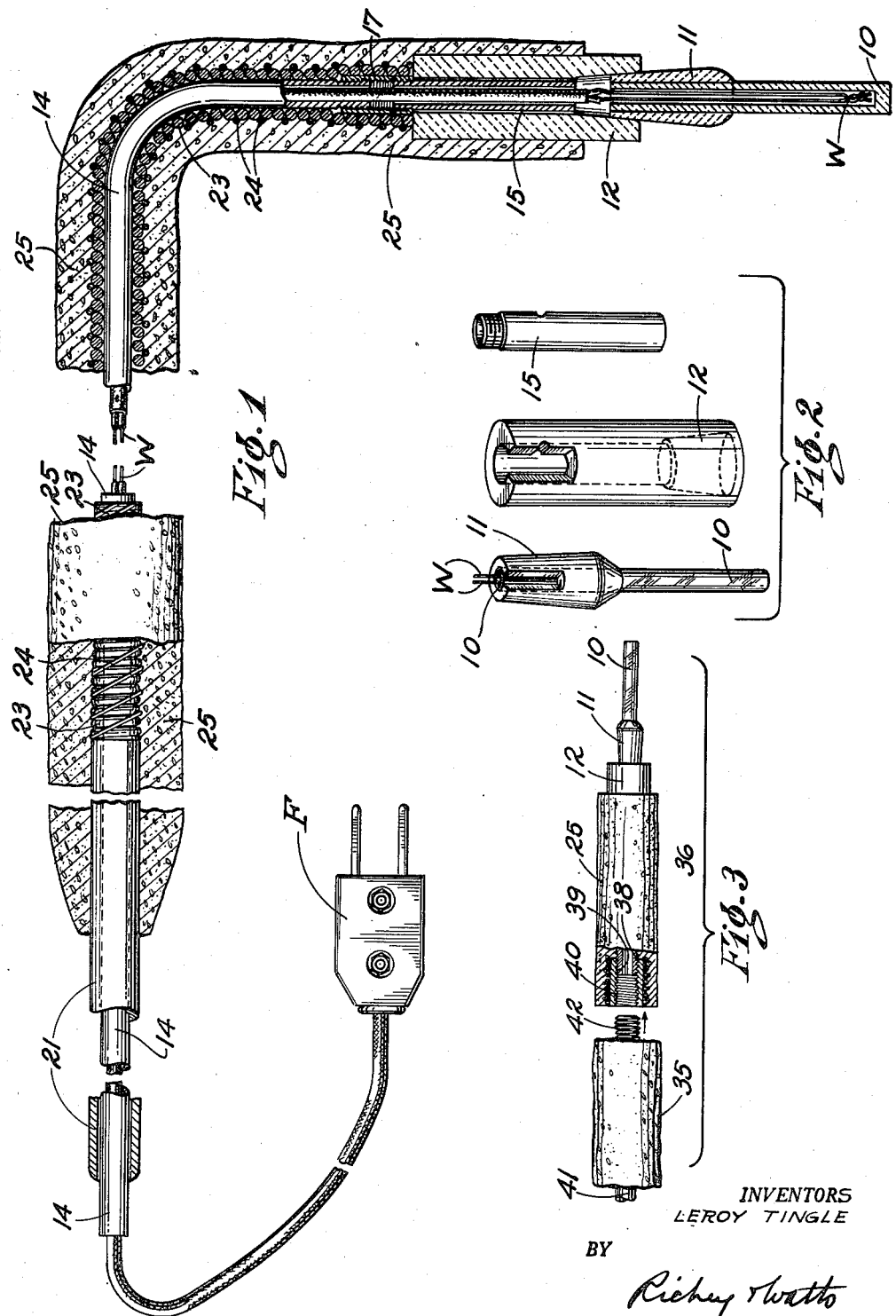
INVENTORS
LEROY TINGLE
BY
Richey & Watts
ATTORNEYS Patented June 12, 1951

2,556,238

UNITED STATES PATENT OFFICE 2,556,238

THERMOCOUPLE CONSTRUCTION

Leroy Tingle, Canton, Ohio, assignor to Republic Steel Corporation, Cleveland, Ohio, a corporation of New Jersey Application March 7, 1947, Serial No. 732,950

8 Claims. (Cl. 136—4)

The present invention relates generally to the art of measuring heat and temperature and is particularly concerned with a novel immersion thermocouple for determining temperatures of molten metals of relatively high melting point temperature.

In conventional immersion type thermocouples comprising a pair of wires having free ends for attachment to a potentiometer and connected ends to be immersed in a molten bath, the connected ends are encased and protected against direct contact with the bath. In one form the casing is difficult to produce and expensive to employ although it is relatively resistant to molten metals and slags, and relatively long lasting. In another form, which is presently generally employed, the casing is comparatively inexpensive and readily applied, but nevertheless is expensive to use because it must be frequently replaced, especially when exposed to contact with molten ferrous metals and the slags usually associated with them. A demand has consequently arisen for a thermocouple which could be constructed of inexpensive casing materials and which would be sufficiently resistant to molten ferrous metals and the like, and could be used repeatedly without requiring repair or replacement.

By virtue of my present invention, this demand has, to the best of my knowledge, been met for the first time. Instead of being capable of only two or three resuses in determining the temperature of open hearth or electric furnace heats a device of this invention can be reused 200 times or more. Furthermore, the accuracy of my thermocouple is as high as prior thermocouples differing only in the type of casing employed, and they have an initial cost which is substantially no greater than the prior devices.

Those skilled in the art will gain a further understanding of my invention upon referring to the drawings accompanying and forming a part of this specification in which, Figure 1 is a view partly in section of a thermocouple of this invention;

Figure 2 is a side elevational view of four elements of the apparatus of Fig. 1; and, Figure 3 is a view partly in section of another form of thermocouple of this invention.

The illustrated thermocouples comprise a pair of thermoelectrically dissimilar wires W attached to an electrical fitting F for engagement with a potentiometer, or other temperature indicating or recording device, and casing means for protecting the wires against fouling by molten baths in which they are immersed, or by the atmosphere, or the slag. A silica tube 10 having a closed lower end and an open upper end forms the immersion tip of the couple casing and receives the joined ends of wires W. The upper end of tube 10 is received in a hollow graphite plug 11, which has tapered outer walls adapted to be received in a flared open end of a graphite sleeve 12. In the couple of Fig. 1, an L-shaped metal pipe 14 having an externally threaded end portion adjacent to the other end of sleeve 12, extends to the other end of the couple, remote from tube 10. A relatively short section of pipe 15 having an externally threaded end portion is secured within sleeve 12 with said threaded portion extending therefrom to be engaged with an internally threaded coupling 17 whereby pipe 15 and the remaining parts of the immersion end of the casing are secured to pipe 14.

Wires W are insulated from each other and other metal articles from fitting F to a point within sleeve 12 adjacent to tube 10, and their exposed portions are protected against contact with molten metal by cement which secures plug 11 to tube 10 and sleeve 12. Pipe 14, except for a short segment adjacent to fitting F, is encased in a succession of layers of materials including a metal sleeve or tube 21 which extends about one-third of the length of the pipe. From the end of tube 21 to coupling 17 the pipe is wound with asbestos rope 23 which is held in place by wire binding 24 and which also encases the coupling and abuts the adjacent end of sleeve 12. A refractory cement layer 25 encases all except the end portions of the assembly, extending from about mid-way of the length of sleeve 21 to a point adjacent to the lower end of sleeve 12.

The couple of Fig. 3 differs from that of Fig. 1 in that the casing is in two parts, viz. a handle or body 35 and a head 36 which is detachable from the body. Head 36 comprises a silica tube 10, a graphite plug 11, and a graphite sleeve 12, which receives the joined or hot ends of the wires W, and forms the immersion end of the thermocouple. A straight metal tube 38 encloses the wires W and has an end portion received in and secured to sleeve 12, and an end portion 39 provided with external threads. A coupling 40 having internal threads is threadwise engaged with end 39 of the tube. Body 35 comprises a straight tube 41 having a threaded end portion 42 for engagement with coupling 40. Tubes 38 and 41 are both encased in asbestos rope 23, wire binding 24 and a refractory cement layer 25, as illustrated in Fig. 1. The cement layer, rope, and wire of head 36 extend from the outer end of coupling 40 to sleeve 12. The cement layer covering tube 41 leaves end 42 exposed for engagement with coupling 40.

The couple of Fig. 1 may be modified as illustrated in Fig. 3, that is, the elbow portion may be made detachable from the straight body or handle portion of the couple. In this event, pipe 15 would extend to a point beyond the elbow. Pipe 14 would be correspondingly shortened but would be engaged with coupling 17 and pipe 15 in the manner illustrated in Figs. 1 and 3, and both pipes would be covered as shown in Fig. 3. The pipe coverings would, of course, be separate and independent insofar as the two parts of the couple are concerned and at the point of engagement the cement layers, etc., would be formed to enable a tight joint to be made between the head or elbow portion and the handle of the couple.

In assembling the thermocouple of Fig. 1, wires W are threaded through pipe 14, coupling 17, pipe 15, and sleeve 12, and the exposed joined ends of the wires are inserted into silica tube 10 to which plug 11 has previously been cemented in fluid tight contact. Plug 11 is then pressed into tight contact with the lower end of the sleeve 12. Coupling 17 is drawn up and the asbestos rope 23 and retaining wire 24 are wound around pipe 14 and coupling 17. The assembly is then encased in cement layer 25 which is permitted to harden before use.

Assembly of the couple of Fig. 3 may be made in generally the manner above described. When the head is to be replaced, it may be disengaged from the body 35 by rotation of the head relative thereto followed by removal of wires W from within the head. The wires are inserted in a new head which is then threadwise engaged with the body 35 by rotating the head relative to said body and engaging the new head with end 42 of the body.

In securing pipe 15 or pipe 38 to sleeve 12, a pin (not shown) is inserted through an opening in the upper side portion of the sleeve to engage a notch in the tube and thus retain the parts in relative position. A small clearance existing between the pipe and sleeve is then packed with cement which firmly joins the parts together upon hardening.

Having thus described the present invention so that those skilled in the art will be able to understand and practice the same, I state that what I desire to secure by Letters Patent is defined in what is claimed.

What is claimed is:

1. An immersion thermocouple comprising a pair of thermoelectrically dissimilar wires connected together at one end, and a covering for said wires comprising a hollow graphite plug having a tapered upper end portion, a silica tube housing the said connected ends of the wires and having a closed end for immersion in a molten bath and an open end disposed in and cemented to the plug, a graphite sleeve surrounding said wires and having a flared open end portion to receive the upper end of the plug in close-fitting engagement, a metal tube surrounding said wires and connected to the sleeve remote from said silica tube, cement covering said sleeve and metal tube, and means for connecting the sleeve and metal tube, said means comprising a second metal tube in the sleeve and secured to the sleeve and having an externally threaded end extending from said sleeve, and an internally threaded coupling threadwise engaged with said latter tube end and engaged with the first metal tube.

2. An immersion thermocouple for determining the temperature of molten metal comprising a pair of thermoelectrically dissimilar wires connected together at one end, and a covering for said wires comprising a hollow graphite plug having a tapered upper end portion; a silica tube housing the said connected ends of the wires and having a closed end immersed in a molten bath and an open end disposed in and cemented to the plug, a graphite sleeve surrounding said wires and having a flared lower open end portion to receive the upper end of the plug in snug-fitting engagement, a metal tube surrounding said wires and connected to the sleeve remote from said silica tube, asbestos rope packing covering a portion of said metal tube, and cement covering said sleeve and metal tube.

3. An immersion thermocouple comprising a pair of thermoelectrically dissimilar wires connected together at one end, and a covering for said wires comprising a hollow graphite plug having a tapered upper end portion, a silica tube housing said connected ends of the wires and having an open end disposed in and cemented to the plug and a closed end extending from the plug, a graphite sleeve surrounding the wires and having a flared lower open end portion to receive the upper end of the plug in snug-fitting engagement, a metal tube surrounding said wires and connected to the sleeve remote from said silica tube, and cement covering said sleeve and metal tube.

4. An immersion thermocouple comprising a pair of wires connected together at one end, and a covering for said wires comprising a tubular graphite plug open at its ends and having a tapered upper end portion, a silica tube to receive the hot end of the thermocouple and having a closed end and an open end extending into and cemented to the plug, a graphite sleeve having a flared open end portion to receive the upper end of the plug in close-fitting engagement, a metal tube having an externally threaded end portion axially spaced from the sleeve and remote from said silica tube, and means for connecting the sleeve and metal tube to define a continuous casing for the thermocouple lead wires, said means comprising a second metal tube in the sleeve and radially spaced from the sleeve and having an externally threaded end extending from said sleeve, cement in the sleeve substantially filling the space between the said second tube and the sleeve and binding the second tube and sleeve securely together, and an internally threaded coupling screwed onto the two metal tubes.

5. For use with a thermocouple to determine the temperature of molten metal baths, a casing for the thermocouple having an end portion for immersion in said baths, said casing end portion comprising a tubular graphite plug open at its ends and having a tapered upper end portion, a silica tube to receive the hot end of the thermocouple and having a closed end and an open end extending into and cemented to the plug, a graphite sleeve having a flared open end portion to receive the upper end of the plug in close-fitting engagement, a metal tube having an externally threaded end portion axially spaced from the sleeve and remote from said silica tube, and means for connecting the sleeve and metal tube to define a continuous casing for the thermocouple lead wires, said means comprising a second metal tube in the sleeve and secured to the sleeve and having an externally threaded end extending from said sleeve, and an internally threaded coupling screwed onto the two metal tubes.

6. For use with a thermocouple having to determine the temperature of molten metal baths, a casing for the thermocouple having an end portion for immersion in said baths, said casing end portion comprising a tubular graphite plug open at its ends and having a tapered upper end portion, a silica tube to receive the hot end of the thermocouple and having a closed end and an open end extending into and cemented to the plug, a graphite sleeve having a flared open end portion to receive the upper end of the plug in close-fitting engagement, a metal tube having an externally threaded end portion axially spaced from the sleeve and remote from said silica tube to receive lead wires of the thermocouple, and means for connecting the sleeve and metal tube to define a continuous casing for the thermocouple lead wires, said means comprising a second metal tube in the sleeve and radially spaced from the sleeve and having an externally threaded end extending from said sleeve, cement in the sleeve substantially filling the space between the said second tube and the sleeve and binding the second tube and sleeve securely together, and an internally threaded coupling screwed onto the two metal tubes.

7. An immersion thermocouple comprising a pair of thermoelectrically dissimilar wires connected together at one end and a covering for said wires comprising a hollow graphite plug having a tapered end portion, a silica tube housing the said connected ends of the wires and having a closed end for immersion in a molten metal bath and an open end disposed in and cemented to the plug, and a graphite sleeve surrounding said wires and having a flared open end portion to receive the tapered end of the plug in close-fitting engagement.

8. Apparatus for enclosing and protecting the hot end of an immersion thermocouple from direct contact with molten metal or slag comprising a hollow graphite plug having a tapered end portion, a silica tube having a closed end for immersion in a molten metal bath and an open end disposed in and cemented to the plug, and a graphite sleeve to surround the wires of a thermocouple and having a flared open end portion to receive the tapered end of the plug in close-fitting engagement.

LEROY TINGLE.

REFERENCES CITED

The following references are of record in the file of this patent:

UNITED STATES PATENTS

| Number | Name | Date |
|---|---|---|
| 2,019,695 | Ross | Nov. 5, 1935 |
| 2,209,788 | Mosher | Nov. 24, 1937 |
| 2,202,533 | Mason | May 28, 1940 |
| 2,303,704 | Oseland | Dec. 1, 1942 |
| 2,463,427 | Richards | Mar. 1, 1949 |

OTHER REFERENCES

Schofield et al., Iron and Steel Inst., Special Report No. 25 (1939), pp. 242-4.

Land, T., Metal Treatment, vol. 7 (1941), page 109, 110.

Weitzenkorn, L. F., Electric Furnace Steel, Proc. 2nd Conf. A. I. M. E. (1944), pp. 144, 147-8.